United States Patent
Feró et al.

(10) Patent No.: US 8,285,077 B2
(45) Date of Patent: Oct. 9, 2012

(54) AUTOMATIC CORRECTION OF DIGITAL IMAGE DISTORTION

(75) Inventors: László Feró, Pomáz (HU); Pál Solymosi, Szentendre (HU); György Tamási, Budapest (HU)

(73) Assignee: Nuance Communications, Inc., Burlington, MA (US)

( * ) Notice: Subject to any disclaimer, the term of this patent is extended or adjusted under 35 U.S.C. 154(b) by 988 days.

(21) Appl. No.: 12/173,501

(22) Filed: Jul. 15, 2008

(65) Prior Publication Data
US 2010/0014782 A1 Jan. 21, 2010

(51) Int. Cl.
G06K 9/36 (2006.01)
G06K 9/32 (2006.01)

(52) U.S. Cl. ......... 382/290; 382/289; 382/296; 382/276
(58) Field of Classification Search ........... 382/289–290
See application file for complete search history.

(56) References Cited

U.S. PATENT DOCUMENTS

| | | | | |
|---|---|---|---|---|
| 5,191,438 A | * | 3/1993 | Katsurada et al. | 382/290 |
| 5,809,167 A | * | 9/1998 | Al-Hussein | 382/190 |
| 5,940,544 A | * | 8/1999 | Nako | 382/293 |
| 6,968,094 B1 | * | 11/2005 | Gallagher | 382/296 |
| 7,463,772 B1 | * | 12/2008 | Lefevere et al. | 382/215 |
| 8,170,368 B2 | * | 5/2012 | Yin et al. | 382/276 |
| 2002/0149808 A1 | * | 10/2002 | Pilu | 358/530 |
| 2003/0026482 A1 | * | 2/2003 | Dance | 382/199 |
| 2008/0204670 A1 | * | 8/2008 | Furui | 353/69 |
| 2008/0260256 A1 | * | 10/2008 | Zeng et al. | 382/195 |
| 2009/0016606 A1 | * | 1/2009 | Meyer et al. | 382/176 |

OTHER PUBLICATIONS

"Rectifying Perspective Views of text in 3D Scenes using Vanishing Points"—Paul Clark, Majid Mirmehdi, Pattern Recognition, 36 (2003) 2673-2686.*

* cited by examiner

Primary Examiner — Michelle Entezari
(74) Attorney, Agent, or Firm — Sunstein Kann Murphy & Timbers LLP

(57) ABSTRACT

A method of de-skewing a digital image is described. An input camera image is initially received, and text within the input camera image is identified. A text direction of the identified text is determined to determine text lines within the camera image. A three-dimensional de-skewing transformation is determined of the text lines to make the text lines horizontal. Then the de-skewing transformation is applied to the input camera image to form a de-skewed output image. An unwarping transformation may also be applied to the input camera image for straightening text lines that are curved.

6 Claims, 3 Drawing Sheets

Original image:

(A)

Processed image:

(B)

Processed image:

(B)

Original image:

(A)

Original image:

Processed image:

(A)

(B)

AUTOMATIC CORRECTION OF DIGITAL IMAGE DISTORTION

FIELD OF THE INVENTION

The present invention relates to image processing, and more specifically to processing images to be suitable for optical character recognition.

BACKGROUND ART

Digital cameras are becoming smaller and more powerful every day. Their image quality and resolution is sufficiently good for using them to take pictures of text documents or objects and turn them into editable text. Existing computer software applications can translate scanned images into editable text using Optical Character Recognition (OCR) technology. However in contrast with scanned images, digital camera images are often distorted because the documents typically are not flat and the camera is generally not perpendicular to the surface of the document.

SUMMARY OF THE INVENTION

Embodiments of the present invention are directed to de-skewing a digital image. An input camera image is initially received, and text within the input camera image is identified. A text direction of the identified text is determined to determine text lines within the camera image. A three-dimensional de-skewing transformation is determined of the text lines to make the text lines horizontal. Then the de-skewing transformation is applied to the input camera image to form a de-skewed output image.

In further specific embodiments, identifying text may include determining black connected components within the input camera image and/or identifying and ignoring non-text components in the input camera image. Determining a text direction may include determining horizontal and/or vertical text directions. The method may also further include applying an unwarping transformation to the input camera image for straightening text lines that are curved.

Embodiments also include a similar computer program product in a computer readable storage medium for de-skewing a digital image. The product includes program code for receiving an input camera image, program code for identifying text within the input camera image, program code for determining a text direction of the identified text to determine text lines within the camera image, program code for creating a three-dimensional de-skewing transformation of the text lines to make the text lines horizontal, and program code for applying the de-skewing transformation to the input camera image to form a de-skewed output image.

In further such embodiments, the program code for identifying text may include program code for determining black connected components within the input camera image and/or program code for identifying and ignoring non-text components in the input camera image. The program code for determining a text direction includes program code for determining a horizontal and/or a vertical text direction. There may also be program code for applying an unwarping transformation to the input camera image for straightening text lines that are curved.

DETAILED DESCRIPTION OF SPECIFIC EMBODIMENTS

Figure 1:
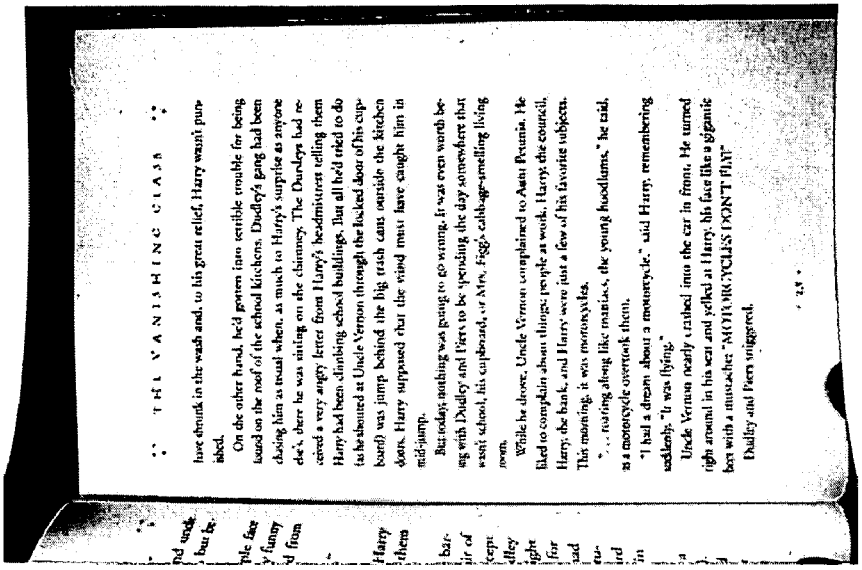
FIG. 1 shows an example of a page image before and after processing according to an embodiment of the present invention.
Figure 1:
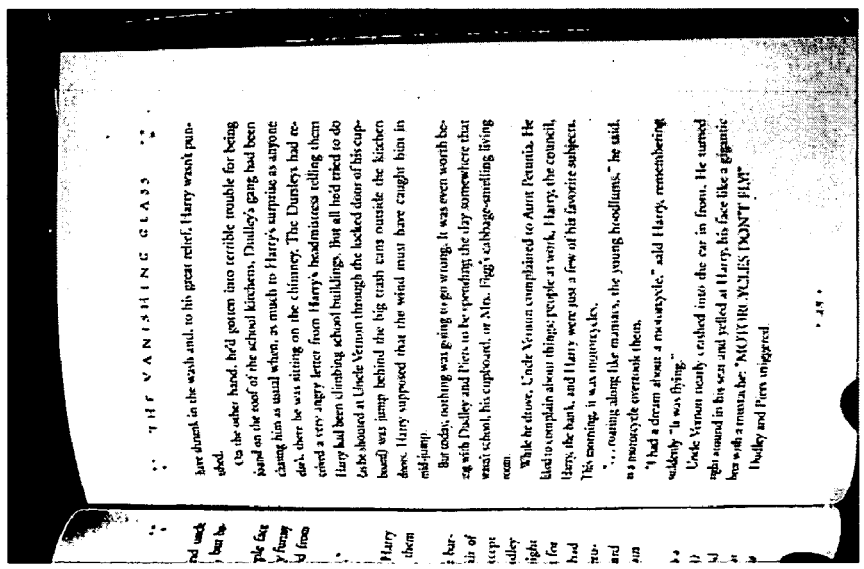
Figure 2:
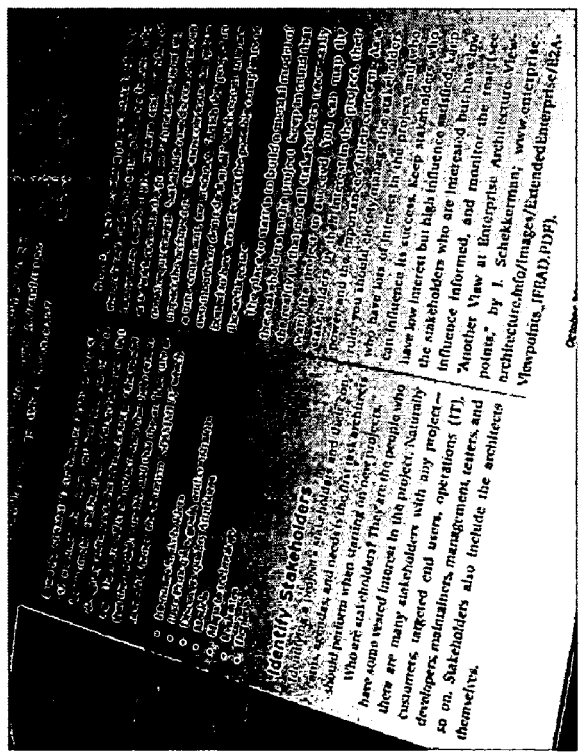
FIG. 2 shows another example of an image of a text page before and after processing according to an embodiment of the present invention.
Figure 2:
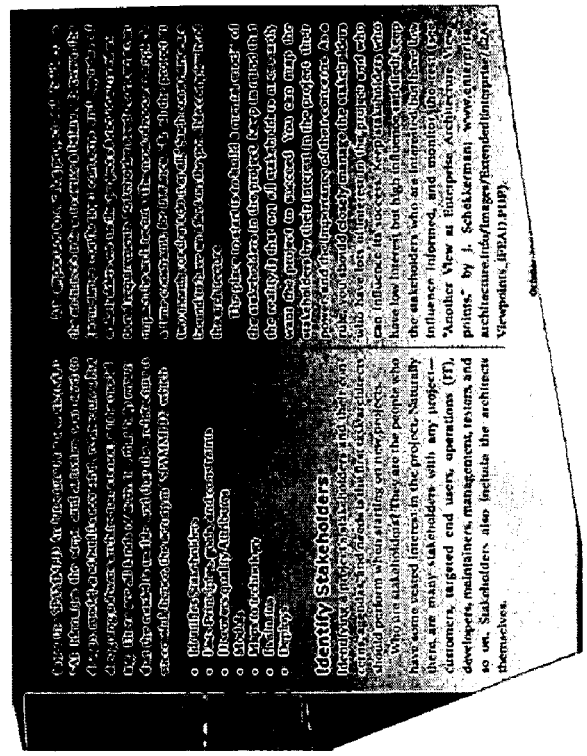

Embodiments of the present invention can automatically correct for perspective (3D) distortion and straighten curved text lines to produce straight lines of text suitable for OCR. This can correct for skew, waves, and/or perspective distortion effects. For example, FIG. 1A shows an example of a page image wherein the page curvatures distorts the text image into curved lines. FIG. 1B shows the same page after processing according to an embodiment of the present invention to straighten and flatten the lines of text in the image which is now usable for OCR. FIG. 2A shows an example of an image of a text page wherein the camera is not square and perpendicular to the page so that the lines of text move obliquely across the image. FIG. 2B shows the image after processing according to an embodiment of the present invention to de-skew and unwarp the image so that the lines of text move squarely and perpendicularly across the image, again leaving it usable for OCR.

Figure 3:
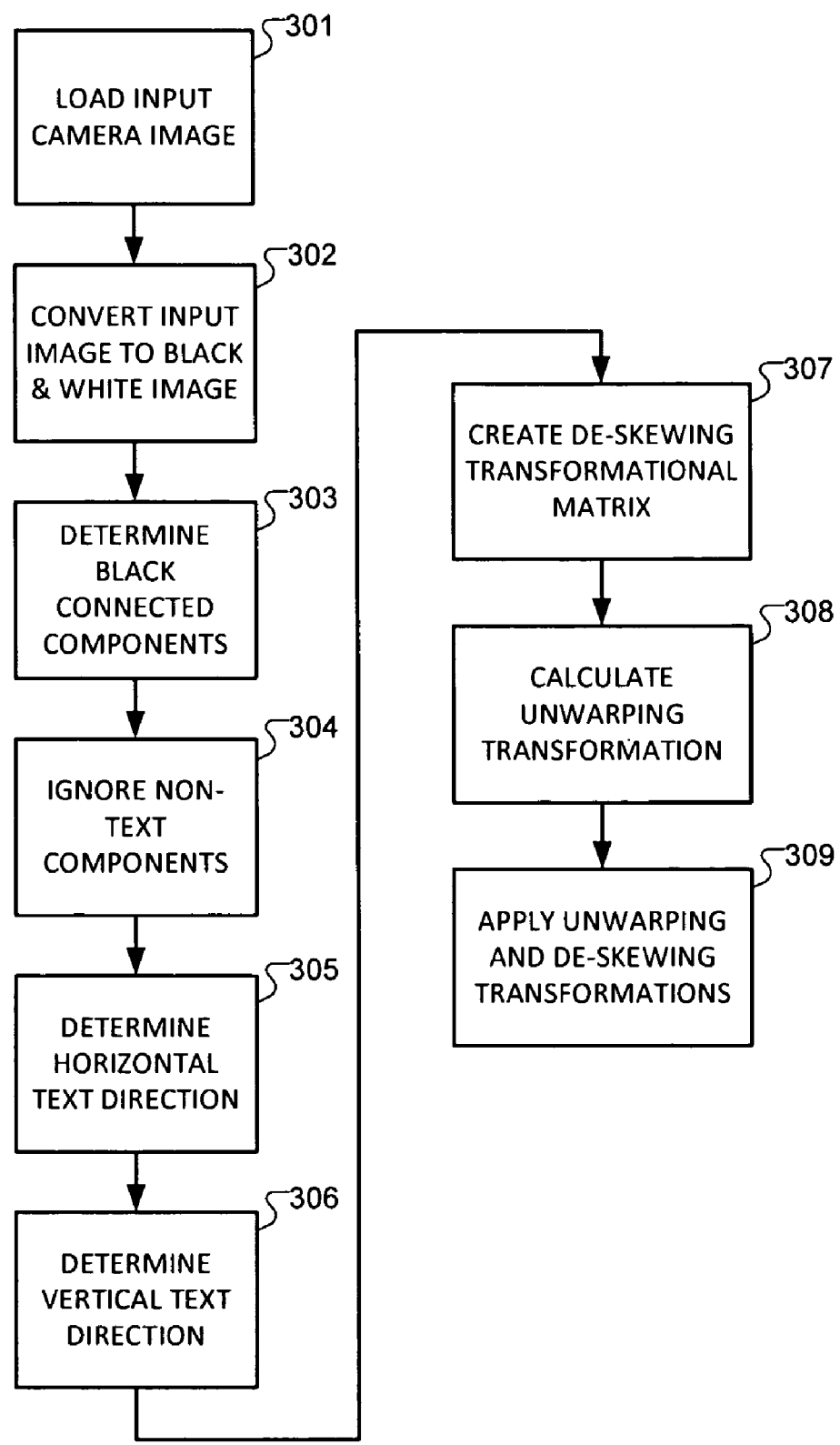
FIG. 3 shows various logical steps in a combined three-dimensional de-skewing algorithm according one specific embodiment of the present invention.

FIG. 3 shows various logical steps in a combined three-dimensional de-skewing algorithm according one specific embodiment of the present invention. Initially, an input camera image is received and loaded into the system, step 301. For example, the input camera image may be an image which was taken by digital camera or cell phone camera. It is assumed that the image contains text and the text on the original document or object contains parallel text lines, but the text in the input camera image can be in any direction. The original camera may not be parallel to the text lines and may not be perpendicular to the surface of the document therefore the camera image is a perspective image. For example, the document might be a book and the pages might be curved, so that the input camera image may contain curved text lines too.

To identify the text within the input camera image, the image is first converted into a black-and-white image using a binarization algorithm, step 302, based on an assumption that the image contains within it black text characters on a white page background. The resulting black and white image contains only black and white pixels. Then black connected components are determined within the black and white image, step 303. A black connected component is a set of connected black pixels which are completely surrounded by white pixels. Black connected components that are probably not represent characters are ignored, step 304. For example, image components that are too small or too large components are probably are not text characters (noise or graphics) and can be ignored without processing. Similarly, image components with an aspect ratio that is too large or too small probably are not text characters and can be ignored. The remaining black connected components are treated as identified text.

Due to perspective distortion, the text lines in the input camera image may not be parallel. So the direction of the identified text is determined next—the relationships between the components of the identified text are examined to determine the direction of the text lines. For example, in the specific embodiment shown in FIG. 3, this starts by determining a horizontal direction of the identified text, step 305, to determine text lines within the camera image. Specifically, a horizontal vanishing point of the text lines is determined which is the point on the perspective image to which the parallel horizontal straight lines appear to converge. The horizontal vanishing point may be determined by finding the closest neighbor to each individual stand-alone component. If the distance of the closest neighbor is less than a predefined threshold, it can be assumed that the corresponding text characters are closer to each other horizontally than vertically, such that the majority of such component pairs are neighboring characters in the same text line. For each text image component having such a closest neighbor, the direction of the center of the neighboring component can be calculated relative to the center of the current component. The directions calculated from the center points can be classified into two sets and, based on the cardinality of theses sets, the main direction can be determined and an initial horizontal direction calculated that is the average of the directions of the larger set.

Next, the outer contour of each text component can be used to determine a corresponding convex hull. The outer contour may be represented by a polygon described boundary point vertexes of the text component. A specific algorithm for this may iteratively throw the vertexes and check the inner angles of the polygon, and if an angle is greater or equal than 180 degrees, the vertex is deleted. This may be repeated until all inner angles of the polygon are less than 180 degrees until a convex polygon is obtained. The coordinates of the vertexes of the polygons can be transformed into a new coordinate system which is defined so that the x axis is parallel to the initial horizontal direction detected previously. The text lines in the new coordinate system will then be nearly horizontal, but may be not parallel.

Horizontal straight lines can be fitted to the top and bottom of each text component and the text lines can be determined by creating linked lists from text components that are horizontally close to each other which have similar top and/or bottom coordinates. Two baselines of each text line can be determined upon which most of the letters sit and under which descenders extend. Accordingly, straight lines are fitted to the top and bottom of the text components. At that point, the horizontal vanishing point can be calculated as the point on the perspective image to which the parallel lines appear to converge, which will be the point where the determined baselines cross each other. Therefore an average crossing point of the baselines is calculated.

The coordinates of the vertexes of the polygons can then be transformed back to the original coordinate system, and a three dimensional transformation matrix can be created that transforms the calculated horizontal vanishing point into infinity in the horizontal direction. This transforms the camera image so that the text lines on the transformed image are horizontal and parallel. In some embodiments, the process of determining the horizontal text direction as described above may be iteratively repeated.

Once the horizontal direction of the identified text is determined, the vertical direction is determined, step 306. If the document contains justified text, the vertical direction can be determined by using the left and right edges of the text columns because the edges of the columns on the camera image are not parallel due to the perspective distortion. The vertical vanishing point of the vertical straight lines can be determined which is the point on the perspective image to which the parallel vertical straight lines appear to converge.

More specifically, the vertical direction of the identified text can be determined as follows. A temporary downscaled image (e.g., a scaling factor of ¼) can be created from the black and white image which preserves black pixels at the expense of white pixels. Then a dilation operation can be executed that is perpendicular to the mean horizontal direction on the downscaled image so that text objects in the text columns get joined and the borders of the columns form a continuous edge. This may involve multiple elementary dilation steps; for example, elementary horizontal, elementary vertical, diagonal-135-degree, and diagonal-45-degree dilations. The horizontal dilatation sets the left and the right neighbor of each black pixel to black, the vertical dilatation sets the upper and the lower neighbor of each black pixel to black, the diagonal-135-degree dilatation sets the upper left and the lower right neighbor of each black pixel to black, and the diagonal-45-degree dilatation sets the lower left and the upper right neighbor of each black pixel to black. From the elementary dilatations, the direction can be selected which is nearest to the predicted vertical direction—the direction perpendicular to the mean horizontal direction. These elementary dilatations can be combined so that the average direction is near to the predicted direction, with the number of the performed elementary dilatation steps depending on the mean distance of the text lines.

Next, the black connected components can be found on the temporary image, which represent joined text objects, typically text columns. The outer contour of each connected component can be determined and stored as a starting point and a set of step vectors. These outer contours may be smoothed by iteratively throwing the vectors and replacing each vector with the average of the surrounding five vectors (the current, the previous two and the next two). Iteratively throwing the vectors may include checking the angle between two following vectors, and if an angle is less than a predefined threshold, replacing the two vectors by their sum. This may then be repeated using a larger threshold.

The step vectors can be selected which are probably either the left or right edge of a text column. For example, the selection can be based on the direction and length of the vectors, and vectors whose length is less than a predefined threshold and/or whose direction is too far from the predicted vertical direction may not be selected. The coordinates of the selected vectors can be transformed using a three dimensional transformation; for example, the same transformation used for the horizontal direction may be reused for the vertical direction. After this transformation the direction of the selected vectors is closer to the vertical direction than to the horizontal direction, and vectors with a starting point below the ending point will be left edges while the other selected vectors will be right edges.

The left edges can be further processed to more precisely determine their direction. The character objects and their convex hull that were detected earlier can also be used for this. The coordinates of the convex hulls can be transformed by the three dimensional transformation. Then for each left edge, the character objects are found that best fits to the edge—these are the nearest character objects next to the edge. For each such character object, the leftmost vertex of the polygon of the character object can be found and a straight line fitted using a least mean square method to thereby calculate the direction of the straight line. The right edges can be similarly processed to more precisely determine their direction, and the results may be verified. Then the mean vertical direction of the edges is calculated, as is the vertical vanishing point at which the vertical straight lines appear to converge. This is the point where the determined edges cross each other and an average crossing point of the edges is calculated.

Once the text direction has been firmly established, a three-dimensional de-skewing transformation matrix can be created that transforms the calculated horizontal vanishing point into infinity in the horizontal direction and the calculated vertical vanishing point into infinity in the vertical direction, without moving the center of the image. This transformation can transform the camera image so that the text lines on the transformed image are horizontal and parallel and the edges of the columns are vertical and parallel, but the curved text lines are not straightened.

The text lines can be checked for curvature and an unwarping transformation calculated, step 308. For example, a smooth two-dimensional shape-distortion model can be estimated for the whole page plane based on the detected two dimensional distortion of the assumed text lines calculated when the horizontal text direction was determined. This two-dimensional approximation of the typical level of real natural three dimensional shape distortions of book or magazine page planes on digital camera photos can produce a usable result as an input for the later OCR-processing while expending much less computational resources than would be needed to calculate and use a true three-dimensional model.

One specific way to do this starts by searching for valid usable line-like baseline-segments of at least 3 to 4 neighboring character-like objects of the same assumed curved text lines, for example, by a line-fitting incremental least-mean-square method based heuristic algorithm. There may be heavily curved text-lines without usable information about the character-code of the character-like objects, so the algorithm may attempt to identify real baseline segments by filtering out character-like objects with locally extreme base-point-positions (e.g. characters with descenders or characters normally not fitting to the baseline). The slope values of the detected line-like baseline-segments will describe the curve of the related text-lines and the curves of the detected text-lines will describe the shape distortion of the page.

To create a smooth-enough model which can tolerate the possible inaccuracies of the base-line segment detection phase described above, the input image may be divided into a set of 64-pixel wide columns, for which it is assumed that the local slope values of the baseline-segments in the same 64-pixel wide column can be approximated via a linear or cubic polynomial of the y-coordinate. The appropriate linear or cubic polynomials describing the slope as a function of the y-coordinate can be created using a least-mean-square method based algorithm, fitting the best polynomial to the slope values of the possible (good enough) baseline segments detected above. A cubic polynomial will only be fitted, if there are enough base points with a global-enough vertical distribution on the y-axis, otherwise, a linear polynomial will be fitted to prevent possible errors caused by a mis-fitted cubic polynomial. If using the validly fitted polynomials provides near zero slope values in most of the 64-pixel wide columns at the top and bottom of the page, it may not be necessary to run the rest of the text-line straightening algorithm. But if using the validly fitted polynomials produces a significant slope value change in two neighboring 64-pixel wide columns at the top and bottom of the page, the input image may represent a book image with two half-pages requiring separate processing. If a polynomial curve does not fit in a specific 64-pixel wide column because of the lack of the appropriate baseline segment data, the approximation data of the nearest neighboring column may be inherited having valid approximation data.

Based on the estimated smooth two dimensional shape distortion model, input data can be generated for the page unwarping algorithm which is intended to undo the estimated shape distortion and straightening the text lines. A two dimensional curve set represented as a set of connected line segment sets can be used to describe the page shape distortion. Each of these curves describes the estimated distortion of the virtual horizontal line going through the center points of the row of a 64×64 pixel grid net mapped to the image. The slope values of the line segments are calculated based on the fitted slope polynomials of the 64-pixel wide columns.

The page unwarping algorithm based on this input data calculates an inverse transformation of the estimated page distortion for each image pixel. For each page shape definition curve (connected line segment set) of the input data, a finer more accurate, smoother connected line segment set is created using an interpolating Catmull-Rom spline based method using the connection points of the input line segment set as spline control points. An interpolating method is useful to ensure that the created spline curve will go through its original control points. Using a Catmull-Rom spline based method (instead of e.g. a B-spline based method) ensures direct getting of an interpolating curve based on the definition of the Catmull-Rom splines without any additionally required computational steps. For calculation of finer shape definition curves, a reference curve will be selected having the longest curve length as approximated with summarized length of the connected line segment set. The shape definition curves are recalculated based on the control point set of the reference curve to create a modified curve set with control point sets having identical distributions on the x-axis. Thus, if $CP(i, j)$ and $CP(i+1, j)$ are the $j^{th}$ control points of the $i^{th}$ and the $(i+1)^{th}$ shape-definition curve, then $CP(i, j).x = CP(i+1, j).x$ will be ensured. While calculating the shape definition curves, the reference curve having the longest curve length will be re-selected and the curve length of this reference curve will be the estimated width of the unwarped page image.

After the de-skewing transformational matrix has been created, step 307, a page unwarping inverse transformation can be calculated, step 308. For a specific destination pixel (x, y) of the expected unwarped image, a source pixel (x', y') of the original image is determined. Since a pixel line of the expected unwarped image is represented by a "pixel-curve" on the original warped image, the matching "pixel-curve" must be calculated for each pixel line of the expected unwarped page image based on the shape definition reference curves, also ensuring that each generated curve must be incrementally "elongated" according to the reference curve that was finally selected. This incremental pixel-wise, curve length sum-based elongation helps ensure that finally the generated unwarped image will contain properly justified text columns with proper vertical borders as expected.

Assuming N final shape definition curves defined as a set of control points $CP(i,j)$, where $0<=i<N$ and $0<=j<M$, for a specific pixel-line with a specific y coordinate of the expected unwarped image, then the calculation works as follows. First the set of control points will be calculated for the specific pixel curve. If the pixel line is above the first shape-definition curve ($y<CP(0,0).y$), then the control-points are based on $CP(0, j)$ by decreasing $CP(0, j).y$ with $(CP(0,0).y-y)$. If the pixel-line is below the last shape-definition curve ($y>CP(N-1, 0).y$), then the control-points are based on $CP(N-1, j)$ by increasing $CP(N-1, j).y$ with $(y-CP(N-1, 0).y)$. If the pixel-line matches one of the shape-definition curves ($y=CP(i, 0).y$), then the original control points $C(i, j)$ can be used. If the pixel-line is in between shape-definition curves i and i+1 ($CP(i, 0).y<y<CP(i+1, 0).y$), then the control points are determined by y-coordinate-based linear interpolation of $CP(i, j)$ and $CP(i+1, j)$.

Having the control points defined ($CCPj$), where $0<=j<M$, the pixel curve data of the inverse-transformation can be calculated pixel-by-pixel by approximating the curve with the appropriate $CCP(j)-CCP(j+1)$ line segments. The incremental elongation of the generated pixel curve based on the reference shape definition curve (represented as $CP(R, j)$) means that during pixel data generation, pixel data is created using line segment CCP(j)-CCP(j+1) as if the real expected length of the CCP(j)-CCP(j+1) line segment would be the length of the matching CP(R,j)-CP(R,j+1) reference line segment (as if one would "elongate" the "image" of the original line segment on the unwarped image according to the matching reference line segment).

Once the three-dimensional de-skewing transformational matrix has been created, step 307, and the page unwarping inverse transformation calculated, step 308, these are then applied to the original camera image, step 309, to produce a de-skewed unwarped output image. This can be done as an iterating throw of the pixels of the output image:

for each pixel, the pixel coordinates are transformed using the unwarping inverse transformation, then the previously calculated coordinates are transformed using the three dimensional de-skew transformation, the 4 nearest pixels on the input image are found and the average color of these pixels is calculated using bilinear interpolation, and the color of the output pixel can be set to the previously calculated value.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of de-skewing a digital image affected by perspective distortion, the method comprising:
    receiving a skewed input camera image affected by perspective distortion and containing curved lines of text;
    identifying text within the input camera image;
    determining a text direction of the lines of text to determine text direction lines including establishing a horizontal text direction based on calculation of a horizontal vanishing point and establishing a vertical text direction based on calculation of a vertical vanishing point;
    applying a three-dimensional de-skewing transformation of the text direction lines without reference to information from any other image; and
    applying a three-dimensional de-skewing transformation of the text direction lines without reference to information from any other image to straighten the curved lines of text and produce a de-skewed output image containing straight horizontal lines of text without perspective distortion.

2. A method according to claim 1, wherein identifying text includes determining black connected components within the input camera image.

3. A method according to claim 2, wherein identifying text includes identifying and ignoring non-text components in the input camera image.

4. A computer program product in a non-transitory computer readable storage medium for de-skewing a digital image affected by perspective distortion, the product comprising:
    program code for receiving a skewed input camera image affected by perspective distortion and containing curved lines of text;
    program code for identifying text within the input camera image;
    program code for determining a text direction of the lines of text to determine text direction lines within the camera image including establishing a horizontal text direction based on calculation of a horizontal vanishing point and establishing a vertical text direction based on calculation of a vertical vanishing point;
    program code for applying a three-dimensional de-skewing transformation of the text direction lines without reference to information from any other image: and
    program code for applying a three-dimensional de-skewing transformation of the text direction lines without reference to information from any other image to straighten the curved lines of text and produce a de-skewed output image containing straight horizontal lines of text without perspective distortion.

5. A product according to claim 4, wherein the program code for identifying text includes program code for determining black connected components within the input camera image.

6. A product according to claim 5, wherein the program code for identifying text includes program code for identifying and ignoring non-text components in the input camera image.

* * * * *